United States Patent [19]

Kurata et al.

[11] Patent Number: 5,799,120
[45] Date of Patent: Aug. 25, 1998

[54] WAVEGUIDE TYPE WAVELENGTH MULTIPLEXING/DEMULTIPLEXING MODULE

[75] Inventors: Kazuhiko Kurata; Naoki Kimura, both of Tokyo, Japan

[73] Assignee: NEC Corporation, Tokyo, Japan

[21] Appl. No.: 759,748

[22] Filed: Dec. 3, 1996

[30] Foreign Application Priority Data

Dec. 4, 1995 [JP] Japan .................................. 7-315385

[51] Int. Cl.[6] .................................................. G02B 6/26
[52] U.S. Cl. ................................ 385/45; 385/14; 385/47
[58] Field of Search .................................. 385/14, 15, 16, 385/20, 21, 22, 31, 37, 42, 45, 47

[56] References Cited

U.S. PATENT DOCUMENTS

| | | | |
|---|---|---|---|
| 5,479,547 | 12/1995 | Kunikane et al. | 385/16 |
| 5,521,993 | 5/1996 | Lerminiaux et al. | 385/42 |
| 5,579,154 | 11/1996 | Mueller-Fiedler et al. | 385/14 |

OTHER PUBLICATIONS

Y. Yamada et al., "A Hybrid Integrated Optical WDM Transmitter/Receiver Module for Optical Subscriber Systems Utilizing a Planar Lightwave Circuit Platform", OFC 1995, PD12-1 to PD12-5.

*Primary Examiner*—John Ngo
*Attorney, Agent, or Firm*—Young & Thompson

[57] ABSTRACT

In a waveguide type wavelength multiplexing/demultiplexing (WDM) module, a wavelength multiplexing/demultiplexing function can be realized with a half length of the conventional directional coupling device. The waveguide type WDM module is comprised of: a common waveguide for conducting first signal light having a first wavelength and second signal light having a second wavelength; common light input/output means coupled to the common waveguide; a substrate containing a WDM unit for multiplexing/demultiplexing the first signal light and the second signal light; a first waveguide for conducting the first signal light; first light input/output means optically coupled to the first waveguide; and second light input/output means for inputting/outputting the second signal light. The WDM unit includes a directional coupling type WDM device constituted by two sets of waveguides connected to the first waveguide and the common waveguide respectively. The directional coupling type WDM device is comprised of: a first edge surface perpendicular to a waveguide for constituting a directional coupling unit at a position equal to a half of a complete coupling length with respect to the first signal light in the directional coupling unit; and wavelength selecting means arranged at the first edge surface, for reflecting the first signal light and for passing there-through the second signal light; and the second light input/output means is comprised of coupling means for optically being coupled to the second signal light at the first edge surface.

18 Claims, 3 Drawing Sheets

WAVEGUIDE TYPE WAVELENGTH MULTIPLEXING/DEMULTIPLEXING MODULE

BACKGROUND OF THE INVENTION

1. Field of the Invention

The present invention is related to a waveguide type wavelength multiplexing/demultiplexing (WDM) module employed in an optical communication, in particular, a wavelength multiplexing transmission.

2. Description of the Related Art

A light transmission system for wavelength-multiplexing light having a plurality of wavelengths different from each other owns various merits that a transmission capacitance can *be increased, and a bi-directional light transmission can be performed. The wavelength-multiplexed light transmission system requires the WDM module for wavelength-multiplexing a plurality of signal light to transmit/receive the wavelength-multiplexed signal light. On the other hand, various structures of the WDM modules have been conventionally proposed and developed. Among these conventional WDM modules, waveguide type modules are suitable for compactness and mass production. One of the conventional waveguide type WDM module is disclosed in Y. Yamada et al., "A Hybrid Integrated Optical WDM Transmitter/Receiver Module for Optical Subscriber Systems Utilizing a Planar Lightwave Circuit Platform" OFC '95 PD12-1 (1995).

As shown in this publication, the conventional waveguide type WDM module employing such a structure that the filter for passing therethrough one light and for reflecting the other light is arranged at the Y-branching unit of the Y-branching buried type waveguide formed in the transparent substrate such as a glass plate. In the conventional WDM module, one light with the wavelength of $\lambda 1$ entered from the fiber to the common waveguide is reflected by the interference filter, and then the reflected light is coupled with the separating waveguide to be entered into the fiber. The other light entered from the fiber into the multiplexing waveguide passes through the interference filter, and then is coupled to the common waveguide to be entered into the fiber.

However, the waveguide provided on the reflection side is necessarily manufactured as the multi-mode waveguide, and also the fiber cannot be used except for the fiber exclusively used to project the light in the conventional waveguide type WDM module. As a result, it could not constitute two-wavelength wavelength-multiplexing transmission module.

Under such a structural reason, this conventional module is limited to a bi-directional transmission/reception module, but could not be applied to other utilization. Also, since the entrance of the light which is separated and then is coupled to the waveguide is controlled by the incident angle of the light entered into the interference filter along the inclination direction, there is a problem that very high precision is required in manufacturing of the groove used to insert the interference filter into this groove. This severe requirement may cause lowering of the yield when the WDM device is formed on the waveguide substrate.

SUMMARY OF THE INVENTION

An object of the present invention is to provide a widely applicable waveguide type WDM module which can be manufactured in a simple manner.

A waveguide type WDM module, according to an aspect of the present invention, is comprised of a first waveguide for conducting first signal light with a first wavelength; a common waveguide for conducting second signal light having a second wavelength and the first signal light; a substrate containing a light synthesizing/separating unit for multiplexing/demultiplexing said first signal light and said second signal light; a first optical fiber optically coupled to the first waveguide; a common light input/output fiber coupled to the common waveguide; and a second optical fiber for inputting/outputting the second signal light.

In this case, the WDM unit corresponds to a directional coupling type WDM device constituted by two sets of waveguides connected to the first waveguide and the common waveguide respectively. The directional coupling type WDM device has an edge surface perpendicular to at a position equal to a substantially half of the directional coupling type WDM unit along a longitudinal direction thereof. The second optical fiber is optically coupled to the second signal light at the edge surface.

The substrate is arranged at the edge surface, and is comprised of a wavelength filter for reflecting the first signal light and for passing therethrough the second signal light. In the directional coupling type WDM device, the length of the WDM unit is substantially equal to a complete coupling length with respect to the second signal light. The second optical fiber is optically coupled to the waveguide connected to the first waveguide at an edge portion.

Concretely speaking, portions of two sets of light waveguides are positioned close to each other on a silicon substrate. A waveguide is formed on the silicon substrate, and a directional coupling type WDM device is formed on this waveguide, which multiplexing/demultiplexing light with a first wavelength of $\lambda 1$ and light with a second wavelength of $\lambda 2$. The WDM unit is cut away perpendicular to an optical axis of the waveguide at a position equal to a half of the complete coupling length with respect to the wavelength of $\lambda 1$, and an edge surface of this WDM unit is made of a mirror surface.

A filter is formed on the edge surface, which may pass therethrough the light with the wavelength $\lambda 2$ and may reflect the light with the wavelength $\lambda 1$. A V-shaped groove is formed in the edge portion where the filter has been formed in such a manner that when the optical fiber is arranged through the filter, the optical axis of the optical fiber is made coincident with the optical axis of one-sided waveguide within two sets of waveguides which are approximated to each other in the WDM unit. Similarly, another V-shaped groove is formed in one edge portions of two sets of light waveguides in such a manner that the optical axis of the light waveguide is made coincident with the optical axis of the optical fiber. The optical fiber is arranged in the V-shaped groove formed in the edge portions of the three waveguides, and then is connected to the transmission path.

In accordance with the waveguide type WDM module of the present invention, two sets of waveguides are approximated to each other, so that the directional coupling type WDM device is formed. This WDM device is cut away perpendicular to the waveguide at a position equal to a half of the complete coupling length with respect to the wavelength $\lambda 1$, and the WDM unit is formed therein. Accordingly, at the edge surface where the filter is fabricated, the light having the wavelength $\lambda 2$ entered from the transmission path connected to such a waveguide that no optical fiber is arranged will pass through the waveguide. While the power of this light is transferred to another waveguide located close to the WDM unit, this light reaches the surface of the filter and thereafter passes through this filter, so that this light is entered into the optical fiber to be conducted to the transmission path.

On the other hand, the light with the wavelength of λ1 entered from the transmission path reaches the filter of the edge portion and is reflected by this filter, while the power of this light is gradually transferred to the WDM unit after passing through the waveguide. In the WDM unit, the power of this light is completely transferred to the waveguide provided on the optical fiber side connected to the other transmission path, and then is conducted to the transmission path. With the above-described arrangement, a WDM module is arranged such that the transmission path 1 is used for the wavelength λ1 +wavelength λ2, the transmission path 2 is used for the wavelength λ1, and the transmission path 3 is used for the wave length λ2.

While employing the above-described structure as a basic structure, WDM units are successively arranged at the edge of one waveguide, so that the wavelengths to be multiplexed may be expanded.

BRIEF DESCRIPTION OF THE DRAWINGS

The above and other objects, features and advantages of the present invention will become more apparent from the following detailed descriptions when taken in conjunction with the accompanying drawings, in which.

DETAILED DESCRIPTION OF THE PREFERRED EMBODIMENTS

Before describing structures of waveguide type WDM modules according to the present invention, one conventional WDM module will now be explained for a better understanding of the inventive idea of the present invention.

Figure 1:
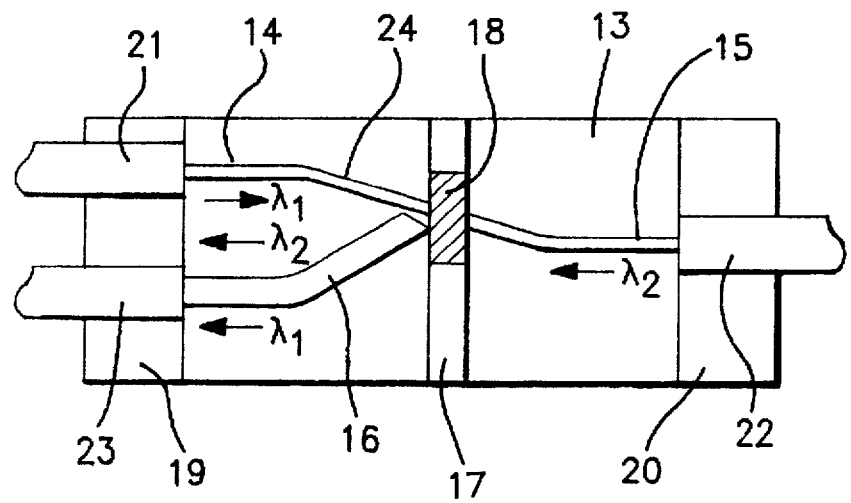
FIG. 1 schematically indicates a structure of a conventional waveguide type WDM module.

FIG. 1 schematically illustrates a structure of one conventional waveguide type wavelength multiplexing/demultiplexing module.

In FIG. 1, buried type waveguides 14, 15, 16 are formed in a transparent substrate 13 such as a glass plate. Among these buried type waveguides, the waveguides 14 and 15 correspond to single-mode waveguides under using light wavelengths, whereas the waveguide 16 corresponds to a multi-mode waveguide. The waveguides 14, 15, 16 are positioned in contact with short edges of the substrate 13 near these short edges at a right angle. The waveguide 14 is coupled to the waveguide 15 by a straight waveguide 24 near a filter insertion groove 17. The groove 17 separates the portion of this straight waveguide 24, and an interference filter 18 is inserted into the groove 17.

The waveguide 16 is such a waveguide having a section larger than a mirror image of the waveguide 14 with respect to a surface normal line of the filter 18. This waveguide 16 is not conducted with the waveguide 14, but is terminated just before the waveguide 14. Also, an outermost layer portion of this waveguide 14 is made of a straight boundary which cannot be substantially influenced by the waveguide 16. As the interference filter 18, an interference filter is employed which may reflect light having a wavelength of "λ1" and may pass light having a length of "λ2".

As indicated by arrows in the above-described conventional WDM device, the light having the wavelength of λ1 entered incident upon the common waveguide 14 from a fiber 21 is reflected on the interference filter 18, and the reflected light is coupled to the light separating waveguide 16 to thereby be entered into another fiber 23. The light having the wavelength of λ2 entered incident upon the optical multiplexing waveguide 15 from another fiber 22 is transmitted through the interference filter 18, and then the transmitted light is coupled to the common waveguide 14 to thereby be entered into the fiber 23. As previously explained, the waveguide type WDM device is constructed in such a manner that this conventional WDM module is applicable to such a system the single mode optical fiber is employed in the transmission path.

Since the light separating waveguide 16 is used as the multi-mode waveguide having such a larger section than the mirror image of the common waveguide 14 related to the surface normal line of the filter 18 in the above-described prior art module, the fiber 23 cannot be utilized as the fiber other than the fiber exclusively used to project the light. Therefore, it is not possible to use this conventional module as such a WDM module that the fiber 22 and the is fiber 23 are used to enter the light, and the fiber 21 is used to project the light. There is another problem that since the light separating waveguide 16 is the multi-mode waveguide, the transmission range (band) becomes narrow and this WDM module is not suitable for a long distance transmission.

As a result, this conventional module is only limited to a bi-directional transmit/receive module, and can be hardly applied to other use modes. Also, the light having the wavelength of λ1 entered from the common waveguide 14 is reflected on the interference filter 18 and then is entered into the light separating waveguide 16, and the light entered incident on the separating waveguide 16 is controlled based upon the inclination incident angle to the interference filter 18. Accordingly, there is another problem that strictly high precision is required in manufacturing of the groove for inserting therein the interference filter. This severe requirement may cause lowering of the yield when the conventional WDM devices are manufactured.

Figure 2:
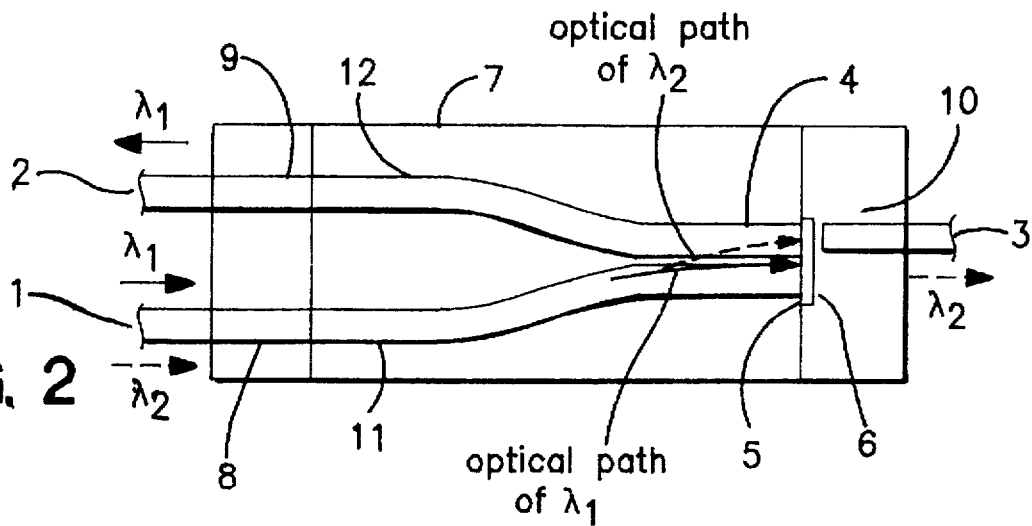
FIG. 2 schematically represents a structure of a waveguide type WDM module according to a first embodiment of the present invention.

FIG. 2 schematically shows a structure of a waveguide type WDM module according to a first embodiment of the present invention. Two sets of waveguides are provided close to each other so as to constitute a directional coupling type WDM unit 4, and these waveguides are a waveguide 11 connected to a transmission path 1, and a waveguide 12 connected to a transmission path 2. This directional coupling type WDM unit 4 is cut away perpendicular to the waveguides at a position equal to a half of a complete coupling length with respect to the wavelength "λ1".

At an edge surface 5, a filter 6 is formed which may pass therethrough the light having the wavelength of λ2 and may reflect the light having the wavelength of λ1. A V-shaped silicon groove is formed on the side of the waveguide 12 of the edge surface 5 where the filter 6 is formed. Then, an optical fiber 10 is mounted without any optical adjustment by making an optical axis of the optical fiber 10 coincident with an optical axis of the waveguide 12, while using this V-shaped groove as a guide. Similarly, V-shaped silicon grooves are formed in one-sided edge portions of two sets of waveguides 11 and 12. Then, the optical fibers 8 and 9 are mounted without any adjustments by making optical axes of the optical fibers 8 and 9 coincident with the optical axes of the waveguides 11 and 12.

The waveguides own simple structures by positioning portions of the two waveguides close to each other. As to the WDM unit, in such a case that a core size of the waveguide is selected to be 4 μm, a refractive index of a cladding is selected to be 1.469, a relative index difference is selected to be 0.25%, and a distance between the adjoining waveguides is selected to be 10 μm, a half of the complete coupling length becomes approximately 4.5 mm while a wavelength of a light emitting element is selected to be 1.31 μm. Also, in the case that a radius curvature of the waveguide is selected to be 10 mm, and an interval between two sets of the waveguides on the side of the transmission paths 1 and 2 is selected to be 2 mm, a length of the waveguide up to the WDM unit becomes approximately 8.7 mm. When a length of the V-shaped groove for mounting the optical fiber is selected to be 4 mm, a length of a waveguide substrate becomes 21.2 mm.

The light having the wavelength of λ2 entered from the transmission path 1 passes through the waveguide 11 and then reaches the WDM unit 4. While transferring the power to the waveguide 12 gradually approximated with this light by way of the mode coupling, the light will reach the edge portion of the waveguide where the filter 6 is formed. At this waveguide edge portion, this light having the wavelength of λ2 passes through the filter 6 arranged at the waveguide edge portion and then is entered into the optical fiber 10 so as to be conducted to the transmission path 3.

On the other hand, the light having the wavelength of λ1 entered from the transmission path 1 passes through the waveguide 11 and then reaches the WDM unit 4, and thereafter is reflected by the filter 6 provided in the rear edge surface. Since the WDM unit 4 is equal to a half of the complete coupling length with respect to the wavelength of λ1, the reflected light having the waveform of λ1 is completely transferred to the waveguide 12 and can be propagated to the transmission path 2. With the above-described arrangements, such a WDM module that the transmission path 1 is equal to the wavelength λ1+the wavelength λ2, the transmission path 2 is equal to the wavelength λ1, and the transmission path 3 is equal to the wavelength λ2.

Figure 3:
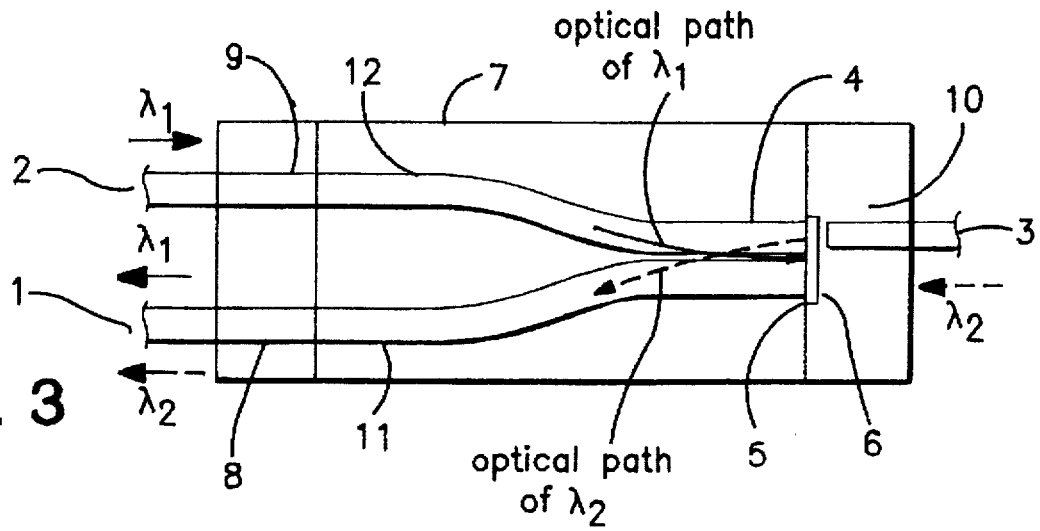
FIG. 3 schematically indicates a structure made when the waveguide type WDM module of the first embodiment of the present invention is applied to the uni-directional wavelength multiplex transmission.

FIG. 3 schematically shows a structure of a waveguide type WDM module according to an embodiment of the present invention, and indicates that signals are transmitted along the same direction. Since the light incident direction to the transmission path may be reversed to the above-explained light incident direction, the light may be entered from the transmission paths 2 and 3 and the light may be projected from the transmission path 1, so that this module may be utilized as a WDM module.

Figure 4:
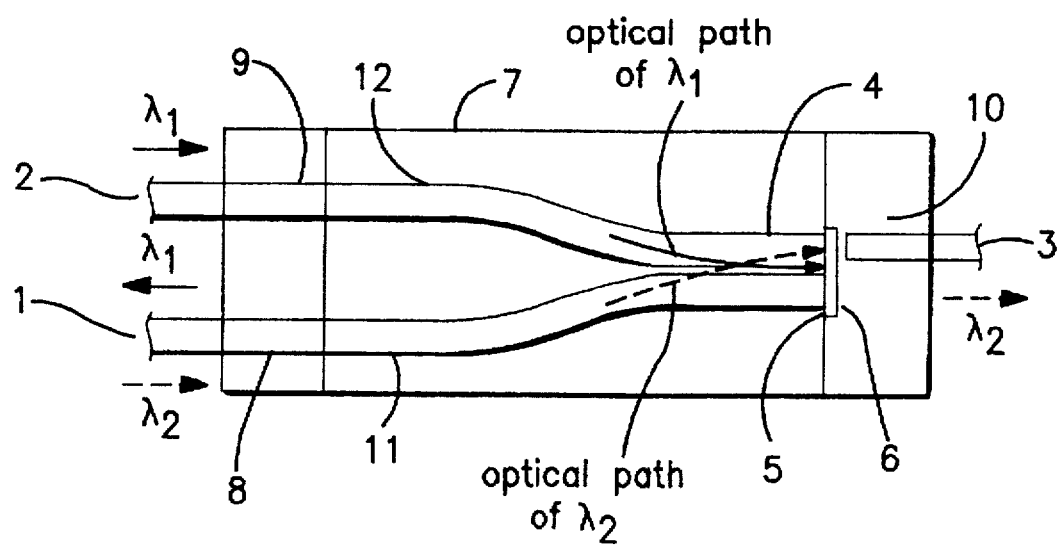
FIG. 4 schematically shows a structure made when the waveguide type WDM module of the first embodiment of the present invention is applied to the bi-directional wavelength multiplex transmission.

FIG. 4 schematically represents a structure of a WDM module in such a case that the waveguide type WDM module of the present invention is applied to a bi-directional wavelength multiplexing transmission. Since the light having the wavelength of λ1 is entered from the transmission path 2 and then projected from the transmission path 1 and the light having the wavelength of λ2 is entered from the transmission path 1 and then projected from the transmission path 3, this module may be utilized as such a bi-directional transmission type WDM module that a bi-directional communication is available in the transmission path 1. Similarly, this module may be utilized as another bi-directional transmission type WDM module such that the light having the wavelength of λ1 is entered from the transmission path and then projected from the transmission path 2, and the light having the wavelength of λ2 is entered from the transmission path 3 and then is projected from the transmission path 1.

As previously described, in accordance with the waveguide type WDM module of the present invention, the portions of two sets of waveguides are merely approximated to each other, so that the WDM module can be constructed. Also, since the directional coupling type WDM unit is formed by employing such a structure that the incident light is reflected by the filter located at a half of the complete coupling length with respect to wavelength λ1, the length of the waveguide substrate can be made shorter than that of the conventional waveguide type WDM module, and can be made compact. Furthermore, a total quantity of waveguides formed on a single wafer can be increased, so that the module can be manufactured in low cost. Also, the module structure can be made in such a simple manner that the filter is adhered on the light waveguide substrate, and the optical fibers are merely mounted in the V-shaped groove, so that the manufacturing yield of this WDM module can be practically increased.

Figure 5:
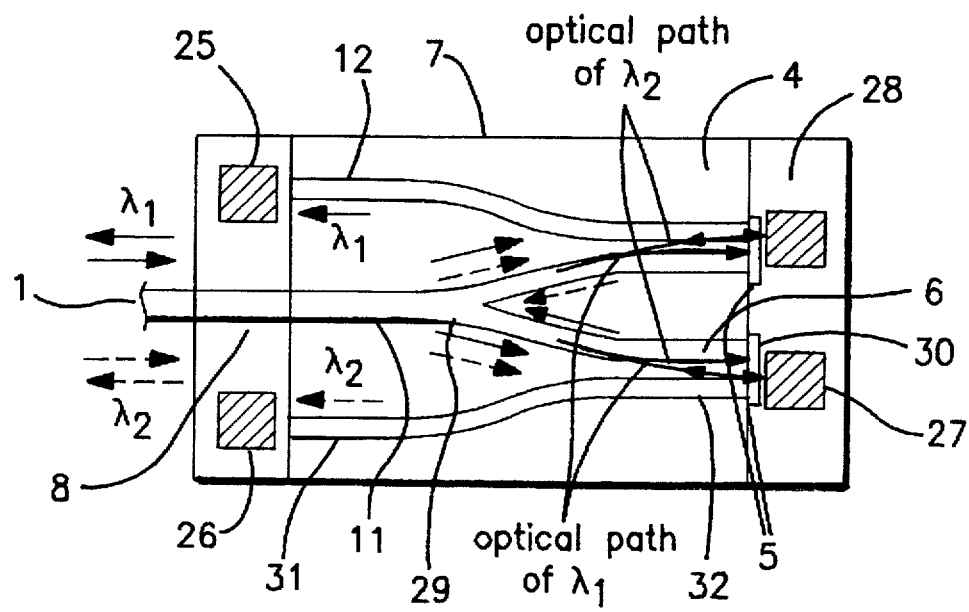
FIG. 5 schematically represents a structure of a waveguide type WDM module according to a second embodiment of the present invention.

Next, a description will now be made of a waveguide type WDM module according to a second embodiment of the present invention. FIG. 5 schematically shows a structure of the waveguide type WDM module according to the second embodiment of the present invention.

In this second embodiment, a common waveguide 11 owns a Y-branching unit 29 at a center thereof. The light branched by the Y-branching unit 29 is conducted to two sets of upper and lower wavelength multiplexing/demultiplexing units 4 and 32, as shown in FIG. 5, respectively. In the WDM units 4 and 32, a similar optical operation to that of FIG. 1 is carried out.

First, effects of the upper-sided WDM unit 4 will be explained. This WDM unit 4 is cut away perpendicular to the waveguide at a length equal to a half of the complete coupling length with respect to the light having the wavelength of λ1. At an edge portion of a substrate 7, a filter 6 is arranged which may pass therethrough the light having the wavelength of λ2 and may reflect the light having the wavelength of λ1.

Among the incident light conducted to the substrate edge portion, the light having the wavelength of λ1 is reflected by the filter 6 and thus can be completely transferred to the waveguide 12. The light transferred to the waveguide 12 is coupled to a light receiving element 25 arranged at the edge portion 5 of the substrate 7. On the other hand, a light emitting element 28 is positioned in a right direction of the filter 6 arranged in the edge portion of the wavelength multiplexing/demultiplexing unit 4. The light having the wavelength of λ2 emitted from the light emitting element 28 is penetrated through the filter 6, and further is projected via the Y-branching unit 29 from the common waveguide 8 to the transmission path fiber 1. It should be noted that since a portion of this light is leaked to the side of the waveguide 12, a filter 40 for blocking the light having the wavelength of λ2 is arranged at a prestage of the light receiving element 25. With employment of the above-described structure, the transmission/reception module may be arranged, while using the light having the wavelength of λ2 as the transmission light, and the light having the wavelength of λ1 as the reception light.

Next, the structure of the lower light synthesizing/separating unit 32 will now be explained. The lower wavelength multiplexing/demultiplexing unit 32 owns a similar structure to that of the previously explained upper WDM unit 4. However, the structure of this lower WDM unit 32 is opposite to that of the upper WDM unit 4 with respect to the wavelength. That is, the lower WDM unit 32 is cut away perpendicular to the waveguide at a length equal to a half of the complete coupling length with respect to the light having the wavelength of λ2. At the edge portion 5 of the substrate 7, another filter 39 is arranged which may pass therethrough the light having the wavelength of λ1 and may reflect the light having the wavelength of λ2.

Among the incident light conducted to the substrate edge portion 5, the light having the wavelength of λ2 is reflected by the filter 30 and thus can be completely transferred to the waveguide 31. The light transferred to the waveguide 31 is coupled to another light receiving element 26 arranged at the edge portion 5 of the substrate 7. On the other hand, another light emitting element 27 is positioned in a right direction of the filter 30 arranged in the edge portion of the WDM unit 32. The light having the wavelength of λ1 emitted from the light emitting element 27 is penetrated through the filter 30, and further is projected via the Y-branching unit 29 from the common waveguide 8 to the transmission path fiber 1. It should be noted that since a portion of this light is leaked to the side of the waveguide 31, a filter 41 for blocking the light having the wavelength of λ1 is arranged at a prestage of the light receiving element 26. With employment of the above-described structure, the transmission/reception module may be arranged, while using the light having the wavelength of λ1 as the transmission light, and the light having the wavelength of λ2 as the reception light.

Since these WDM units 4 and 32 are arranged on the upper and lower sides, it is possible to constitute a two-wavelength light transmission/reception module with the function to transmit/receive the signal light having the wavelength of λ1, and with the function to transmit/receive the signal light having the wavelength of λ2. As previously explained, the reason why the wavelengths of the light are inverted in the upper and lower WDM units is such a fact that the light emitting elements 27 and 28 having the wavelengths of λ1 and λ2 are arranged on the right side, whereas the light receiving elements 25 and 26 are arranged on the left side, as viewed in FIG. 5.

Since the light emitting elements are arranged opposite to the light receiving elements while sandwiching the waveguide substrate, the transmission unit and the reception unit can be arranged on each of both sides in the combined manner. In addition, such a separate unit arrangement can prevent an occurrence of electric crosstalk from the transmission unit to the reception unit. Moreover, since the light emitting elements 27 and 28 can be positioned close to each other, an array-shaped light emitting element may be used. On the other hand, since the light receiving elements 25 and 26 are arranged with sandwiching the common waveguide 8, the crosstalks occurred between the reception units can be reduced as much as possible.

Figure 6:
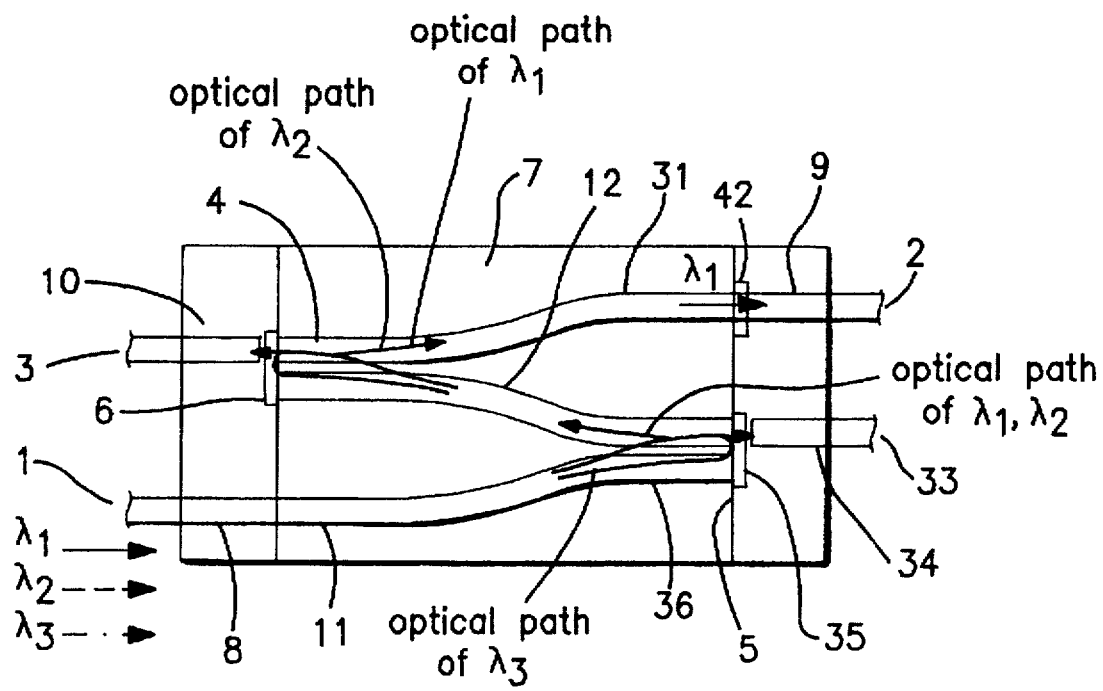
FIG. 6 schematically represents a structure of a waveguide type WDM module according to a third embodiment of the present invention.

Subsequently, a description will now be made of a waveguide type WDM module according to a third embodiment of the present invention. FIG. 6 schematically represents a structure of the waveguide type WDM module according to the third embodiment of the present invention. That is, the waveguide type WDM module of this third embodiment is equipped with a function such that signal light having three wavelengths is wavelength-multiplexed to be transmitted, or received.

The structure of this third embodiment is featured by adding the WDM unit 4 to the above-explained structure of FIG. 1. A WDM unit 36 is cut away perpendicular to the waveguides at a position near equal to a half of complete coupling lengths with respect to the wavelengths of λ1 and λ2. The WDM unit 4 is cut away perpendicular to the waveguide at a length equal to a half of the complete coupling length with respect to the light having the wavelength of λ1. At an edge surface of the WDM unit 36, a filter 35 is arranged which may pass therethrough the light having the wavelength of λ3 and may reflect the light having the wavelengths of λ1 and λ2. At the edge surface of the WDM unit 4, the filter 6 is arranged which may pass therethrough the light having the wavelength of λ2 and may reflect the light having the wavelength of λ1. The optical fiber 34 is arranged so as to be coupled with the side of the waveguide 12 of the WDM unit 36, and further the optical fiber 10 is arranged so as to be coupled with the side of the waveguide 31 of the WDM unit 4. The optical fiber 9 is arranged in order to be coupled with the edge surface 5 of the waveguide 31.

The light with the wavelength of λ3 entered from the transmission path 1 passes through the filter 35 and is entered into the transmission path 33. On the other hand, the light with the wavelengths of λ1 and λ2 entered from the transmission path 1 is reflected by the filter 35. Thereafter, the light having the wavelengths of λ1 and λ2 is completely transferred to the waveguide 12 and then is conducted to the WDM unit 4. In this WDM unit 4, the light with the wavelength of λ2 passes through the filter 6 to be entered into the transmission path 3. On the other hand, the light with the wavelength of λ1 is reflected by the filter 6 in this WDM unit 4, and then is completely transferred to the waveguide 31, and thereafter is entered into the transmission path 2.

In accordance with the third embodiment, the three-wavelength WDM module is arranged. In this third embodiment, the light with the wavelength of λ1 is entered from the transmission path 2, the light with the wavelength of λ2 is entered from the transmission path 3, the light with the wavelength of λ3 is entered from the transmission path 33, and the light having the wavelengths of λ1, λ2 and λ3 is projected from the transmission path 1.

Figure 7:
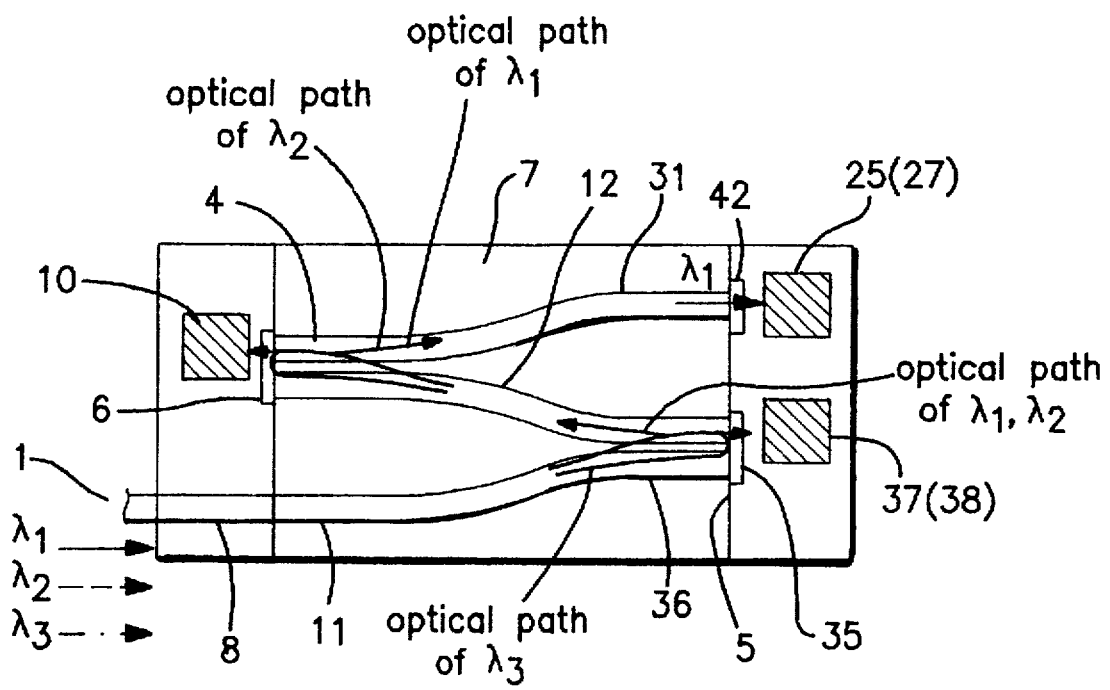
FIG. 7 schematically represents a structure of a waveguide type WDM module according to a fourth embodiment of the present invention.

Furthermore, a waveguide type WDM module according to a fourth embodiment of the present invention will now be explained. FIG. 7 schematically indicates a structure of the waveguide type WDM module according to the fourth embodiment of the present invention. The waveguide type WDM module of this embodiment is equipped with a function to wavelength-multiplex signal light with three wavelengths. In this fourth embodiment, it is so arranged that instead of the above-described optical fibers 9, 10, 34 in the third embodiment shown in FIG. 6, light receiving elements 25, 26, 37 with the wavelengths of λ1, λ2, λ3 are arranged. Also, a filter 42 for removing the signal light with the wavelengths of λ2 and λ3 is arranged at a prestage of the light receiving element 25.

Alternatively, instead of the light receiving elements 25, 26, 37 employed in FIG. 7, light emitting elements 27, 28,

38 which are capable of emitting light with wavelengths corresponding thereto may be arranged to thereby constitute a three-wavelength light transmission module.

While this invention has been described in connection with certain preferred embodiments, it is to be understood that the subject matter encompassed by way of this invention is not to be limited to those specific embodiments. On the contrary, it is intended for the subject matter of the invention to include all alternative modification and equivalents as can be included within the spirit and scope of the following claims.

What is claimed is:

1. A waveguide type wavelength multiplexing/demultiplexing module comprising:

a common waveguide for conducting first signal light having a first wavelength and second signal light having a second wavelength;

common light input/output means coupled to said common waveguide;

a substrate containing a wavelength multiplexing/demultiplexing unit for multiplexing/demultiplexing said first signal light and said second signal light;

a first waveguide for conducting said first signal light;

first light input/output means optically coupled to said first waveguide; and second light input/output means for inputting/outputting said second signal light; wherein:

said light multiplexing/demultiplexing unit includes a directional coupling type wavelength multiplexing/demultiplexing device constituted by two sets of waveguides connected to said first waveguide and said common waveguide respectively;

said directional coupling type light synthesizing/separating device is comprised of:

a first edge surface perpendicular to a waveguide for constituting a directional coupling unit at a position equal to a half of a complete coupling length with respect to said first signal light in said directional coupling unit; and wavelength selecting means arranged at said first edge surface, for reflecting said first signal light and for passing therethrough said second signal light; and said second light input/output means is comprised of coupling means for optically being coupled to said second signal light at said first edge surface.

2. A waveguide type wavelength multiplexing/demultiplexing module as claimed in claim 1 wherein:

said wavelength selecting means is an interference filter.

3. A waveguide type wavelength multiplexing/demultiplexing module as claimed in claim 1 wherein:

said first light input/output means, said second light input/output means, and said common light input/output means each contain a first optical fiber, a second optical fiber, and a common optical fiber.

4. A waveguide type wavelength multiplexing/demultiplexing module as claimed in claim 3 wherein:

said substrate is a silicon substrate.

5. A waveguide type wavelength multiplexing/demultiplexing module as claimed in claim 4 wherein:

said first waveguide, said second waveguide, said common waveguide, and said wavelength multiplexing/demultiplexing unit are made of silicon oxide.

6. A waveguide type wavelength multiplexing/demultiplexing module as claimed in claim 5 wherein:

said substrate is comprised of a V-shaped groove for arranging therein said first optical fiber and said common optical fiber.

7. A waveguide type wavelength multiplexing/demultiplexing module as claimed in claim 1 wherein:

said first light input/output means includes a light receiving element for receiving said first signal light having said first wavelength; and said second light input/output means includes a light emitting element for emitting said second signal light having said second wavelength.

8. A waveguide type wavelength multiplexing/demultiplexing module as claimed in claim 7 wherein:

said first light input/output means includes an optical filter for blocking said second signal light having said second wavelength.

9. A waveguide type wavelength multiplexing/demultiplexing module comprising: first wavelength multiplexing/demultiplexing means having a first common input/output waveguide formed on a substrate, for multiplexing/demultiplexing first signal light having a first wavelength and second signal light having a second wavelength; second wavelength multiplexing/demultiplexing means having a second common input/output waveguide formed on said substrate, for multiplexing/demultiplexing third signal light having said first wavelength and fourth signal light having said second wavelength; a Y-branching unit formed on said substrate, for branching/coupling said first input/output means and said second input/output means; a common waveguide connected to said Y-branching unit; and transmission path light input/output means coupled to said common waveguide; wherein:

said first wavelength multiplexing/demultiplexing means includes:

a first wavelength multiplexing/demultiplexing unit for synthesizing/separating said first signal light and said second signal light;

a first waveguide for conducting said first signal light having said first wavelength;

first light input/output means optically coupled to said first waveguide; and second light input/output means for inputting/outputting said second signal light; in which:

said first wavelength multiplexing/demultiplexing unit includes a directional coupling type wavelength multiplexing/demultiplexing device constituted by two sets of waveguides connected to said first waveguide and said first common waveguide respectively; said directional coupling type wavelength multiplexing/demultiplexing device is comprised of: a first edge surface perpendicular to a waveguide for constituting a directional coupling unit at a position equal to a half of a complete coupling length with respect to said third signal light in said directional coupling unit; and first wavelength selecting means arranged at said first edge surface, for reflecting said first signal light and for passing therethrough said second signal light;

said second light input/output means is comprised of coupling means for optically being coupled to said second signal light at said first edge surface; and wherein:

said second wavelength multiplexing/demultiplexing means includes:

a second wavelength multiplexing/demultiplexing unit for multiplexing/demultiplexing said third signal light and said fourth signal light;

a second waveguide for conducting said fourth signal light having said second wavelength;

fourth light input/output means optically coupled to said second waveguide; and third light input/output means for inputting/outputting said third signal light; in which:

said second wavelength multiplexing/demultiplexing unit includes a directional coupling type wavelength multiplexing/demultiplexing device constituted by two sets of waveguides connected to said first waveguide and said first common waveguide respectively; said directional coupling type wavelength multiplexing/demultiplexing device is comprised of: a second edge surface perpendicular to a waveguide for constituting a directional coupling unit at a position equal to a half of a complete coupling length with respect to said fourth signal light in said directional coupling unit; and second wavelength selecting means arranged at said second edge surface, for reflecting said fourth signal light and for passing therethrough said third signal light; and said third light input/output means is comprised of coupling means for optically being coupled to said third signal light at said second edge surface.

10. A waveguide type wavelength multiplexing/demultiplexing module as claimed in claim 9 wherein:

said first wavelength selecting means and said second wavelength selecting means are interference filters.

11. A waveguide type wavelength multiplexing/demultiplexing module as claimed in claim 9 wherein:

said first light input/output means includes a light receiving element for receiving said first signal light having said first wavelength;

said second light input/output means includes a light emitting element for emitting said second signal light having said second wavelength;

said third light input/output means includes a light receiving element for receiving said fourth signal light having said second wavelength; and said fourth light input/output means includes a light emitting element for emitting said third signal light having said first wavelength.

12. A waveguide type wavelength multiplexing/demultiplexing module as claimed in claim 11 wherein:

said first light input/output means includes a first optical filter for blocking said signal light having said second wavelength; and said third light input/output means includes a second optical filter for blocking said signal light having said first wavelength.

13. A waveguide type wavelength multiplexing/demultiplexing module comprising:

a common waveguide for conducting wavelength-multiplexed signal light containing first signal light having a first wavelength, second signal light having a second wavelength, and third signal light having a third wavelength;

common light input/output means coupled to said common waveguide;

a first wavelength multiplexing/demultiplexing unit for selectively deriving said third signal light from said wavelength-multiplexed signal light and for coupling said derived third signal light to said third light input/output means;

a second wavelength multiplexing/demultiplexing unit connected via a first waveguide to said first wavelength multiplexing/demultiplexing unit, for selectively deriving said second signal light from said wavelength-multiplexed signal light and for coupling said derived second signal light to said light input/output means; and third light input/output means connected via a second waveguide to said second wavelength multiplexing/demultiplexing means and coupled with said first signal light; wherein:

said first wavelength multiplexing/demultiplexing unit includes a directional coupling type wavelength multiplexing/demultiplexing device constituted by two sets of waveguides connected to said first waveguide and said common waveguide respectively; said directional coupling type wavelength multiplexing/demultiplexing device is comprised of: a first edge surface perpendicular to a waveguide for constituting a directional coupling unit at a position equal to a half of a complete coupling length with respect to said first signal light, or said second signal light in said directional coupling unit; and first wavelength selecting means arranged at said first edge surface, for reflecting said first signal light and said second signal light and for passing therethrough said third signal light; and second light input/output means for coupling said third signal light; and wherein:

said second wavelength multiplexing/demultiplexing unit includes a directional coupling type wavelength multiplexing/demultiplexing device constituted by two sets of waveguides connected to said first waveguide and said second waveguide respectively; said directional coupling type wavelength multiplexing/demultiplexing device is comprised of: a second edge surface perpendicular to a waveguide for constituting a directional coupling unit at a position equal to a half of a complete coupling length with respect to said first signal light in said directional coupling unit; and second wavelength selecting means arranged at said second edge surface, for reflecting said first signal light and for passing therethrough said second signal light; and second light input/output means for coupling said second signal light.

14. A waveguide type wavelength multiplexing/demultiplexing module as claimed in claim 13 wherein:

said first wavelength selecting means and said second wavelength selecting means are interference filters.

15. A waveguide type wavelength multiplexing/demultiplexing module as claimed in claim 14 wherein:

said first light input/output means includes a light receiving element for receiving said first signal light having said first wavelength;

said second light input/output means includes a light emitting element for emitting said second signal light having said second wavelength; and said third light input/output means includes a light receiving element for receiving said third signal light having the first wavelength.

16. A waveguide type wavelength multiplexing/demultiplexing module as claimed in claim 15 wherein:

said first light input/output means includes an optical filter for blocking said second signal light and said third signal light.

17. A waveguide type light synthesizing/separating module as claimed in claim 14 wherein:

said first light input/output means, said second light input/output means, and said third light input/output means each include an optical fiber.

18. A waveguide type wavelength multiplexing/demultiplexing module as claimed in claim 17 wherein:

said first light input/output means includes an optical filter for blocking said second signal light and said third signal light.

* * * * *